Sept. 5, 1967          B. J. LANCE                3,339,385
                  PIPE BENDING APPARATUS
Filed April 22, 1966                      3 Sheets-Sheet 1
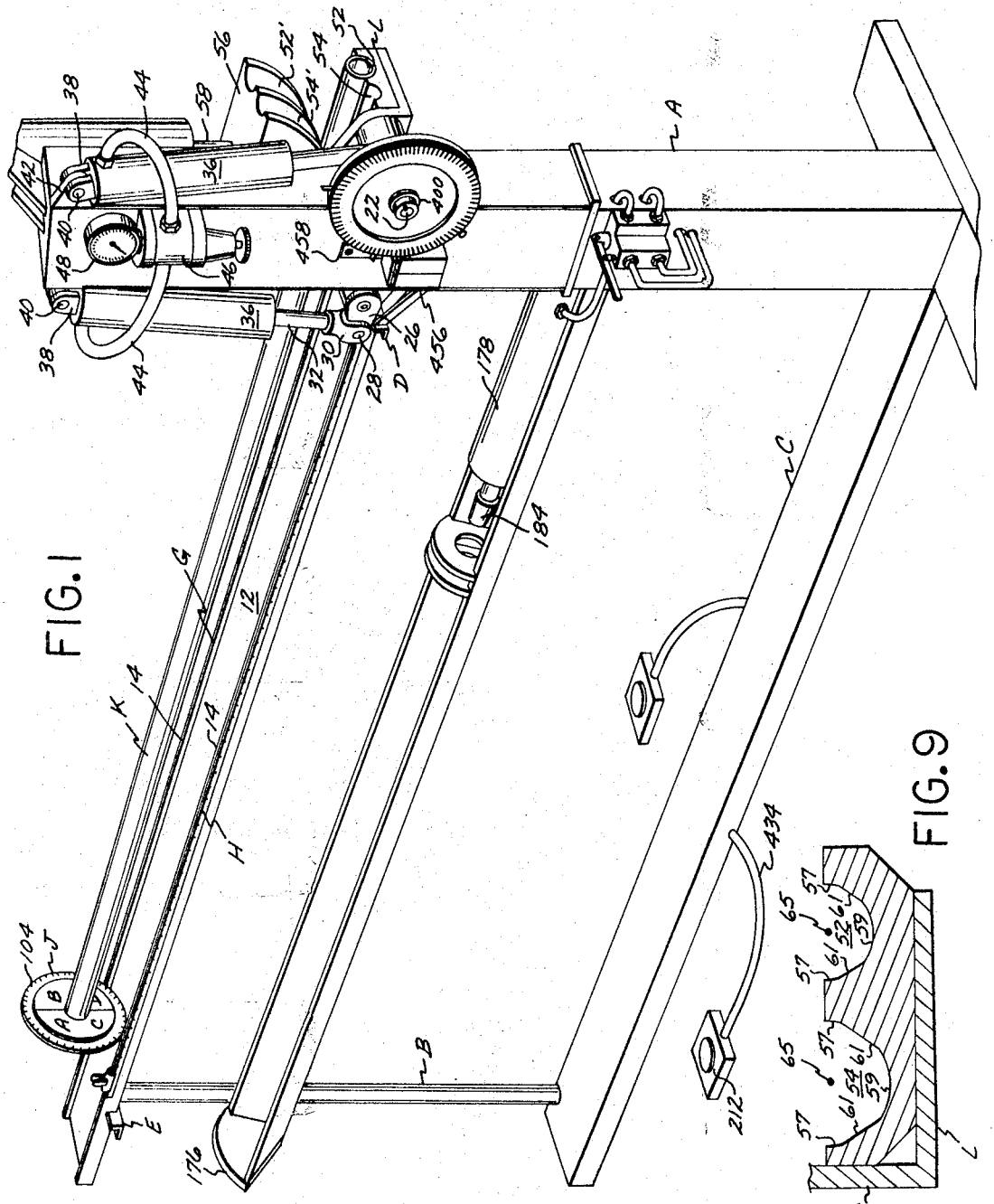
INVENTOR.
BRUCE J. LANCE
BY
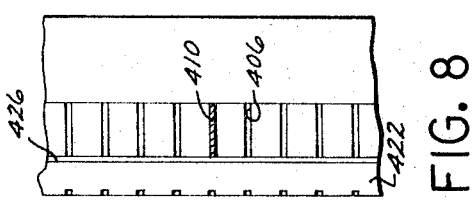
ATTORNEY Sept. 5, 1967  B. J. LANCE  3,339,385
PIPE BENDING APPARATUS
Filed April 22, 1966  3 Sheets-Sheet 2
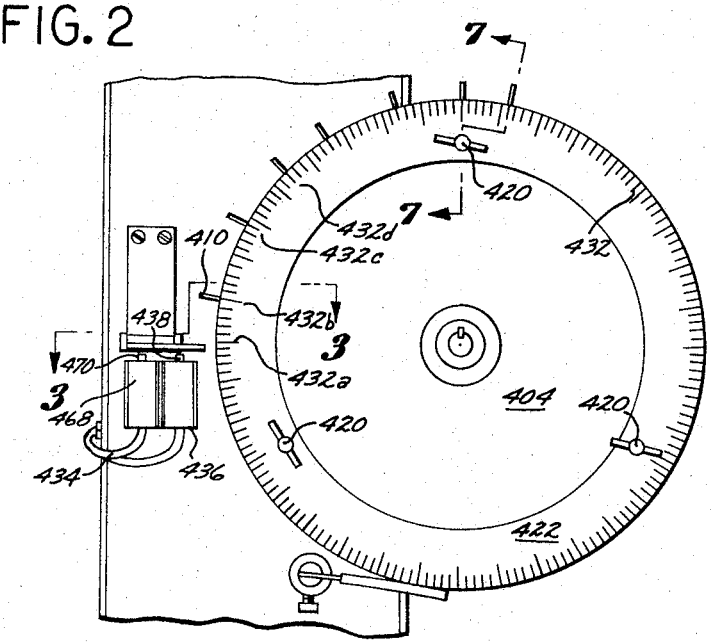
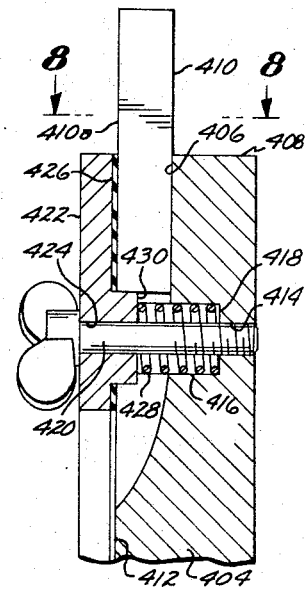
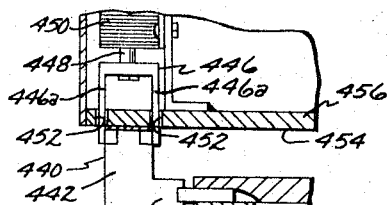
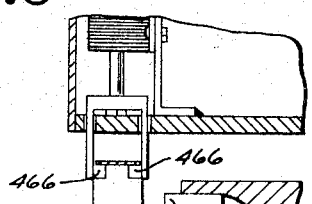
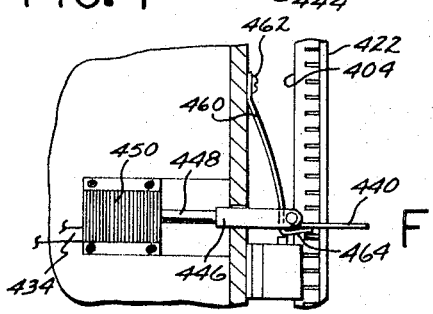
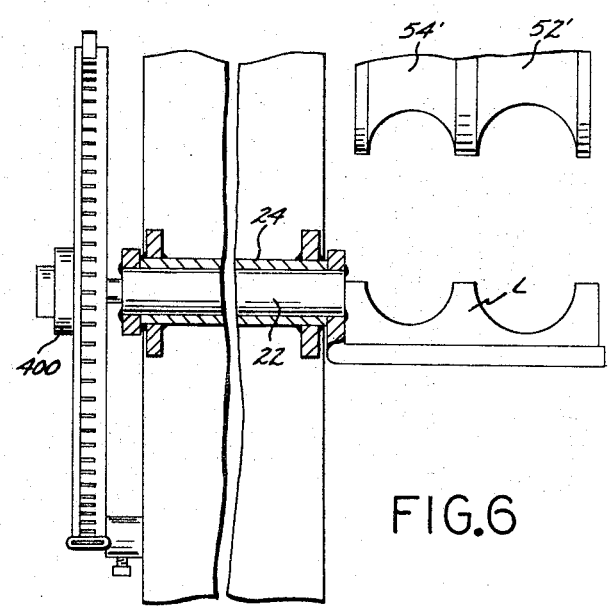
INVENTOR.
BRUCE J. LANCE
BY
William Q. Babcock
ATTORNEY Sept. 5, 1967  B. J. LANCE  3,339,385
PIPE BENDING APPARATUS
Filed April 22, 1966  3 Sheets-Sheet 3

INVENTOR.
BRUCE J. LANCE
BY
William Q. Babcock
ATTORNEY

United States Patent Office 3,339,385
Patented Sept. 5, 1967

3,339,385
PIPE BENDING APPARATUS
Bruce J. Lance, 1460 Chase Drive,
Corona, Calif. 91720
Filed Apr. 22, 1966, Ser. No. 544,512
7 Claims. (Cl. 72—22)

The present invention relates generally to the automotive field, and more particularly to an improved apparatus for forming a sequence of bends of desired angulation in a length of straight tubing to provide a replacement automotive exhaust pipe or for such other use to which bent tubing may be put.

The present application is a continuation-in-part of my application entitled Tube Bend Device, filed in the Patent Office Mar. 12, 1965, under Ser. No. 439,387. Said application Ser. No. 439,387, which issued as United States Letters Patent No. 3,279,236 on Oct. 11, 1966, is in turn a continuation-in-part of my application entitled Apparatus for Forming Replacement Exhaust Pipes and Method of Using Same, filed Dec. 15, 1961, under Ser. No. 159,604, which issued as United States Letters Patent No. 3,196,661 on July 27, 1965.

In my previous applications an apparatus was disclosed that is adapted for use in forming a straight length of tubing into one having a sequence of longitudinally spaced bends of desired angulation therein and serve as a replacement exhaust pipe for a particular make of automobile and yearly model thereof. However, the apparatus disclosed in my prior applications required a manual adjustment after each bend was formed in the tubing, to place the apparatus in condition to form the next bend of desired angulation. The disadvantage of such adjustments is the time involved, and due to the number thereof, the possibility of error increased, particularly when a consecutive number of straight tubes are being transformed into replacement exhaust pipes, all of which are of the same angular configuration.

A major object of the present invention is to provide an improved pipe bending apparatus, which by a single manual adjustment can be set to repeatedly reproduce a sequence of bends of desired angulation in a series of straight pipes or tubes as they are moved longitudinally through the apparatus.

Another object of the invention is to supply a tube bending apparatus which is more convenient to operate than that disclosed in my prior patent and patent application, and one which minimizes the occurrence of error made in one or more of a sequence of straight pipes subjected to bending by the apparatus into the same angular configurations.

Yet another object of the invention is to provide an apparatus which requires a minimum of maintenance attention, and can form bends of desired angulation in straight lengths of tubing, that are substantially free of longitudinally extending creases.

These and other objects and advantages of the present invention will become apparent from the following description thereof, and from the accompanying drawings illustrating the same, in which:

FIGURE 1 is a perspective view of the improved tube bending apparatus, which may be manually adjusted to form a sequence of longitudinally spaced bends of desired angulation in a length of straight tubing as the tubing is moved through the apparatus;

FIGURE 2 is a fragmentary elevational view of a portion of the apparatus, illustrated in FIGURE 1, showing the adjustable means used in forming a sequence of spaced bends in a length of tubing;

FIGURE 3 is a transverse cross sectional view of a portion of the apparatus shown in FIGURE 2, taken on the line 3—3 thereof;

FIGURE 4 is the same cross sectional view shown in FIGURE 3, after a portion of the apparatus has been moved to a second position to permit a disc-supported tab to pass thereby;

FIGURE 5 is a side elevational view of that portion of the apparatus shown in FIGURE 4, taken on the line 4—4 thereof;

FIGURE 6 is a combined vertical cross-sectional and end elevational view of that portion of the apparatus shown in FIGURE 2;

FIGURE 7 is an enlarged fragmentary vertical cross-sectional view of that portion of the apparatus shown in FIGURE 2, taken on the line 7—7 thereof;

FIGURE 8 is a top plan view of that portion of the apparatus shown in FIGURE 7, taken on the line 8—8 thereof;

FIGURE 9 is a fragmentary transverse cross-sectional view of one of the jaws of the apparatus, taken on the line 9—9 of FIGURE 1;

Figure 11:
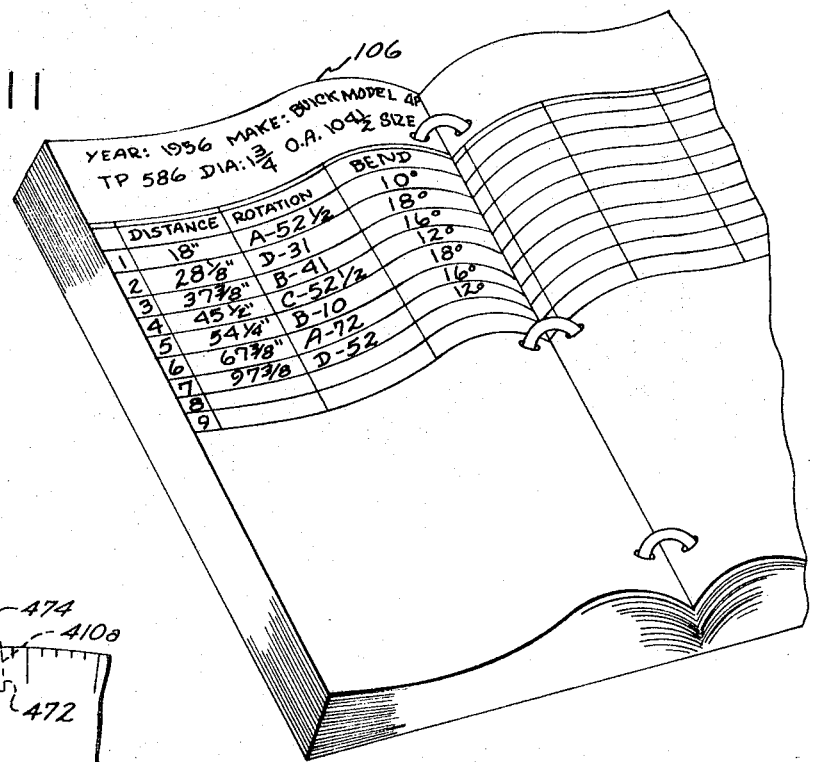
Figure 12:
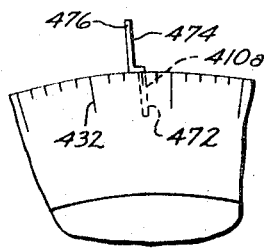

FIGURE 11 is a perspective view of a binder which retains a number of looseleaf sheets therein which disclose the longitudinal spacing of the bends required in an exhaust pipe for a particular make of automobile and yearly model thereof, as well as the angulation of each of these bends; and FIGURE 12 is a fragmentary front elevational view of a portion of the disc shown in FIGURE 2, supporting a modified form of tab thereon.

With continued reference to the drawings for the general arrangement of the improved apparatus, it will be seen in FIGURE 1 to include a vertical column A and one or more uprights B spaced therefrom. The lower portions of column A and uprights B can either be embedded in a concrete foundation, or if the apparatus is to be moved from place to place, on a suitable base or movable support C, such as a trailer, or the like.

A protractor support G is provided that comprises an elongate rectangular web 12 and two parallel flanges 14 which project upwardly from the sides thereof. Support G is movably supported on transversely positioned angle irons D and E supported by the column A and uprights B. The support G is also laterally movable on these angle iron members for reasons that will later become apparent.

A tape measure H or other measuring device extends longitudinally along one of the exterior surfaces of the flanges 14, as also shown in FIGURE 1. A circular protractor J that is graduated in quadrants is removably mounted on one end of a straight length of tubing K which is to be bent into a replacement exhaust pipe. The protractor J is rotatably supported between opposite upper edge portions of the flanges 14.

Two identical tube bending jaws L are longitudinally aligned (FIGURE 1) and rigidly affixed to two identical L-shaped plates 18. Plates 18 are affixed to the forward ends of two identical short shafts 22, which are rotatably supported in bearings 24 affixed to opposite sides of column A. Arms 26 project outwardly from the rear ends of shafts 22, and a pin 28 extends through each of these arms to pivotally engage the bifurcated end 30 of a piston rod 32. Each piston rod 32 has a piston 34 mounted on the upper end thereof which are longitudinally movable in two downwardly and outwardly extending cylinders 36. Eyes 38 are provided on the upper ends of cylinders 36 through which pins 40 extend, and are supported by lugs 42 projecting outwardly from the upper portion of column A.

Figure 10:
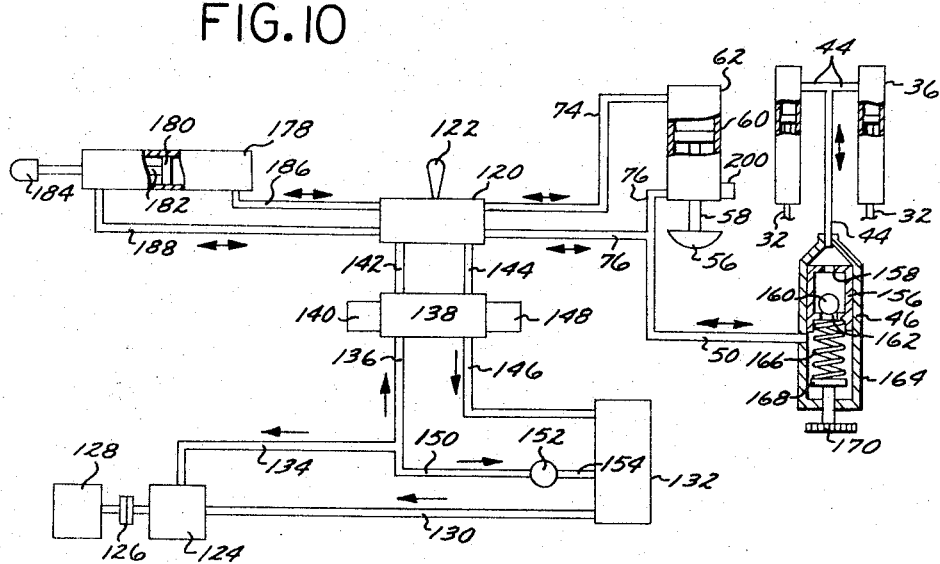
FIGURE 10 is a schematic diagram of a hydraulic system used in the apparatus.

Fluid under pressure can be introduced into cylinders 36 through two hoses 44, which are connected to a pressure control valve 46. A pressure gauge 48 is connected to valve 46 and hydraulic fluid under pressure is supplied to this valve through a hose 50, as shown in FIGURE 10.

Two laterally spaced, longitudinally extending grooves 52 and 54 are formed in jaws L, as best seen in FIGURE 9. The grooves 52 are preferably one and three-quarter inches in diameter and grooves 54 two inches in diameter. These dimensions for grooves 52 and 54 are so selected inasmuch as most exhaust pipes currently used on automotive vehicles are either one and three-quarter or two inches in external diameter.

The grooves 52 and 54 are generally semi-circular, each of which has two longitudinally extending sections 57 and a lower longitudinally extending section 59, which are of the same radius of curvature as that of the external surface of the tubing K to be bent by the use thereof. In each of the grooves 52 and 54 sections 57 and 59 are connected by two laterally spaced, downwardly and inwardly extending straight sections or chords 61, as best shown in FIGURE 2.

A semi-circular pressure member 56 is centrally located relative to the jaws L, situated thereabove, as shown in FIGURE 1. Two semi-circular grooves 52' and 54' are formed in pressure member 56 which are in vertical alignment with the grooves 52 and 54. The pressure member 56 is located on the lower end of a piston rod 58, the upper end of which is connected to a piston 60, as shown in FIGURE 10.

Piston 60 is slidably movable within the confines of a hydraulic cylinder 62, with the lower end of the piston rod 58 slidably and sealingly engaged. The hydraulic cylinder 62 has a closed upper end that is pivotally supported from the upper portion of column A, as shown in detail in my Patent No. 3,196,661. Hydraulic liquid under pressure can be discharged into the upper confines of cylinder 62 through a conduit 74 (FIGURE 10) to force the piston 60, piston rod 58, and pressure member 56 downwardly. Likewise, when fluid is permitted to escape through the conduit 74, fluid can be discharged into the lower confines of cylinder 62 through a conduit 76 to force the piston 60, piston rod 58, and pressure member 56 upwardly to place this pressure member in the position shown in FIGURE 1.

When fluid under pressure is discharged through the conduit 74 into cylinder 62, the piston 60, piston rod 58, and pressure member 56 are moved downwardly to permit either the groove 52' of the pressure member or groove 54' thereof to engage a desired portion of the tubing K. As a downward force is applied to this engaged portion, the jaws L pivot outwardly away from one another to impart a curve of a desired degree to that portion of the tubing K situated between the pressure member 56 and the jaws. Jaws L resist this outward movement in opposite directions, and the degree of this resistance is dependent on the magnitude of force exerted by the piston rods 32 on the arms 26. The degree of resistance the piston rods 32 will exert on arms 26 is, of course, dependent on the pressure at which fluid is discharged through the pressure control valve 46 to the upper confines of the cylinders 36.

As soon as the pressure member 56 ceases to apply a downward force to that portion of tubing K situated within the jaws L, and the pressure member starts to move upwardly to the position shown in FIGURE 1, the fluid under pressure in the cylinders 36 starts to move the piston rods 32 downwardly to return jaws L into horizontally aligned positions.

The right-hand one of the shafts 22 (FIGURE 1) has a hub 400 secured thereto by a key 402, with the hub being of such structure that it only rotates when the shaft 22 rotates in a counterclockwise direction. A disc 404 is secured to hub 400. A number of radially extending, circumferentially spaced slots 406 are formed in disc 404 that extend inwardly from the outer peripheral edge 408 thereof. Slots 406 are preferably formed on two degree spacing.

A number of thin rectangular tabs 410 are provided, each of which is selectively disposable in any one of the slots 406. Each tab 410 is of such length and width that when the tab is disposed in one of the slots 406, it projects outwardly beyond the surface 408, as well as slightly forwardly from the forward surface 412 of the disc 104, as can best be seen in FIGURE 7. A number of tapped bores 414 are formed in disc 404, each of which is in communication with a recess 416, also formed in the disc, with each recess being of substantially greater transverse cross section than that of the bores 414 with which it is associated. Each tapped bore 414 and its associated recess 416 cooperatively define a ring-shaped body shoulder 418 at the junction thereof.

Each of the tapped bores 414 is removably engageable by a thumb screw 420. A flat ring 422 is provided in which a number of circumferentially spaced bores 424 are formed that are alignable with the tapped bores 414. The interior surface of ring 422 is covered with a layer of resilient material 426, as may best be seen in FIGURE 7, which material abuts against the forward edges 410a of the tabs 410 positioned in slots 406. A number of compressed helical springs 428 are provided that are disposed in the recesses 416, with ends of the compressed spring being in abutting contact with the body shoulder 418 and surfaces 430 of the ring 422. Graduations 432, preferably on two degree spacings, are formed on the exterior surface of ring 422 (FIGURE 2), and these graduations are in radial alignment with the slots 406.

When the protractor J is mounted on the right-hand end of the tubing K, as shown in FIGURE 1, it rests on the upper edges of the flanges 14 of the protractor support G. The inner edges of one of the flanges 14 may serve as a reference edge for the graduations 104 on the protractor J. The diameter of the protractor J is such that when resting on the flanges 14, it cooperates with either groove 52 or 54 to support the tubing K in a substantially horizontal position.

A loose-leaf binder or other book 106 is provided (FIGURE 11) which carries tabulations therein for each make of automobile, each yearly model thereof, and lists the diameter of the exhaust pipe, the length thereof, the longitudinal distances between the bends therein, the degree of each bend, and the rotational relationship in degrees of each bend relative to the bends disposed most adjacent thereto.

The first step in fabricating the tubing K to conform to the configuration of the exhaust pipe (not shown) to be replaced, is to determine the overall length of tubing required, which is preferably obtained by consulting an appropriate page in the binder 106. The next step is to consult the column entitled "Bend," and in sequence starting with the graduation 432a, shown in FIGURE 2 as a reference, consecutively place tabs 410 in slots 406 in accordance with the angulations listed in this "Bend" column.

Thus, the first tab 410 would be placed in a slot 406 that was in alignment with the graduation 432b, which is ten degrees from the graduation 432a. The next tab 410 would be placed in a slot 406 that is radially aligned with graduation 432c, which is 18 degrees from the graduation 432b. The next tab 410 would be placed in a slot 406 that is in alignment with a graduation 432d, which is separated 16 degrees from the graduation 432c. Additional tabs 410 are placed in the slots 406 in accordance with the various angulations listed in the "Bend" column.

Although the first bend listed in this column is that of ten degree angulation, the actual bend formed in the tubing K will be twice that angulation, for in forming a bend of 20 degree angulation, each of the shafts 22 only pivots through one-half this angulation or ten degrees. To avoid confusion on this score, the true angulation of the bend to be formed is not listed in the "Bend" column of the binder 106, but rather one-half this amount, which is the actual degree of angulation through which one shaft 22 and the disc 404 supported thereon moves in forming the desired angle.

In forming a replacement exhaust pipe from tubing K, the protractor J is removably mounted on the tubing K that has been cut to the correct length. Thereafter the tubing K is disposed as shown in FIGURE 1 with the left-hand end portion thereof resting in either the grooves 52 or 54, depending on the diameter of the tubing K and with the protractor J on the support G. Binder 106 is then consulted to determine the longitudinal distance of the center of the first bend from the left-hand end of the tubing K, which in the illustration given would be eighteen inches. The tubing K and protractor J are then moved relative to the support G, and by use of the measuring tape H the tubing is so positioned as to permit a bend of twenty degrees to be formed in tubing K when the pressure member 56 is caused to move downwardly relative to the jaws L.

The rotational spacing between the bends is determined from the central column entitled "Rotation" in the binder 106. Thus, to form the first bend in tubing K at eighteen inches from the left-hand end thereof, the protractor J is so disposed that the quadrant $a$ thereof is positioned adjacent the reference, which may be one of the edges of the flanges 14 or other desired reference point, and the protractor is rotated until fifty-two and one-half degrees as imprinted thereon is in alignment with the reference previously mentioned.

By consulting the binder 106 it will be seen that the second bend is twenty-eight and one-eighth inches from the left-hand end of tubing K, as illustrated in FIGURE 1. As the tubing K and protractor J are moved to form bends therein, the protractor J occupies a succession of positions on the support G, one of which is shown in FIGURE 1.

The tape H is preferably of the well known resilient steel strip type which is windable upon a spring-loaded reel (not shown) encased in a housing 114 affixed to one exterior side of one of the flanges 14, as best seen in FIGURE 2. The free end of tape H is removably held at a desired position relative to one of the flanges 14 by a spring-loaded clip 116. This position is normally one in which the tape H is unreeled to the length of the cut tubing K that is to be bent to form a replacement exhaust pipe.

After the tubing K and protractor J have been moved to the second position to place a portion of the tubing twenty-eight and one-eighth inches from the left-hand end thereof under the pressure member 56, the pressure member is thereafter caused to move downwardly to form a second bend of thirty-six degrees in tubing K by means of controls to be described in detail hereinafter.

This operation is performed successively until all seven of the bends specified in binder 106 have been completed, and the tubing K will have been transformed into a replacement exhaust pipe. In the event the tubing K is to be transformed into an exhaust pipe on which no bending data is available in printed form in binder 106, then this information must be obtained directly from the exhaust pipe by measurement.

Movement of the pressure member 56 upwardly and downwardly occurs concurrently with movement of the piston 60 and piston rod 58. The piston 60 is moved downwardly in the hydraulic cylinder 62 when hydraulic fluid under pressure is discharged therein through the conduit 74, with that fluid trapped under the piston 60 in the cylinder 62 discharging through the conduit 76. Conduits 74 and 76 are connected to a valve 120 that is manually controlled by a handle 122. Valve 120 is normally in a first position that permits the free flow of fluid therethrough to the conduits 74 and 76.

A pump 124 is provided, as may best be seen in FIGURE 11, that may be mounted in any convenient location relative to the column A. Pump 124 is driven by a coupling 126 that in turn is connected to an electric motor 128. The suction of pump 124 is connected by a conduit 130 to the lower portion of a reservoir tank 132 that is preferably concealed within the lower portion of column A.

Fluid is discharged from the pump 124 through a conduit 134 that is in communication with a conduit 136 which extends to a multi-position valve 138. Valve 138 can be moved to a first position by energization of a solenoid 140. When the solenoid 140 is energized, fluid is discharged through the valve 138 to flow through a conduit 142 to the valve 120, and from this valve through the conduit 74 to the upper confines of the cylinder 62 to move the piston 60 and pressure member 56 downwardly. When the valve 138 is in this first position, fluid can flow from the conduit 76 through the valve 120 to a conduit 144 that is connected to the valve 138. Fluid enters the valve 138 from the conduit 144 and is discharged to a conduit 146 that returns the fluid to the reservoir 132.

When a second solenoid 148 forming a part of the valve 138 is electrically energized, this valve is moved to a second position where fluid discharges therefrom in a path the reverse of that previously described. In this second path, the fluid from valve 138 flows through the conduits 144 and 76 to the lower portion of the cylinder 62 to raise the piston 60, piston rod 58, and pressure member 56 to the position shown in FIGURE 1. Concurrently with this upward movement of the pressure member 56, fluid is discharged from the upper portion of the cylinder 62 through the conduit 74, valve 120, conduit 144, valve 138, and conduit 146 to return to the reservoir 132.

The solenoid 140 is electrically energized by manually closing a switch 212, as shown in FIGURE 1, that is preferably foot-operated. The electric circuit 434 of which switch 212 forms a part, is connected to a source of domestic electricity (not shown) and also includes a normally closed electric switch 436, best seen in FIGURE 2, that is placed in the open position when a member 438 is moved downwardly. After switch 212 is manually moved to a closed position, the electric circuit 434 is held in a condition to energize the solenoid 140 by relay means (not shown). When member 438 is moved downwardly, the relay previously mentioned (not shown) is de-energized, and the circuit 434 is broken.

When the circuit 434 to solenoid 140 is broken, this circuit by switch means (not shown), but illustrated and described in my Patent No. 3,196,661, is completed to solenoid 148 to move valve 138 to a second position. Hydraulic fluid under pressure then flows to the lower portion of cylinder 62 through conduit 76 to move the pressure member 56 upwardly until it occupies the position shown in FIGURES 1 and 6. The apparatus is thereafter in condition to repeat the above described operation and form another bend in the tubing K.

The member 438 is moved downwardly by the downward deformation of a resilient L-shaped member 440, best seen in FIGURES 3–5 that includes two legs 442 and 444 disposed in a direction normal relative thereto. The forward portion of leg 442 is rigidly secured to a U-shaped element 446 that is secured to the rear end of an armature 448 which is slidably movable in a solenoid 450. Two laterally spaced legs 446a of element 446 are slidably supported in openings 452 formed in the rear wall 454 of a box 456 that is held in a fixed position on column A by a bracket 458.

Element 446 and armature 448 are at all times urged rearwardly to the position shown in FIGURE 4 by a deformed downwardly extending spring 460, the upper end of which is secured by screws 462 to the exterior surface of wall 454. The lower end of spring 460 is in the form of a hook 464 that engages two laterally spaced protuberances 466 provided on the rear ends of legs 446a.

A normally closed switch 468 is connected to the electric circuit 434 and to solenoid 450. Switch 468 is positioned adjacent switch 436. A movable member 470 forms a part of switch 468. When member 470 is moved downwardly, the electric circuit to solenoid 450 is broken, whereby the spring 460 moves the member 440 from a first position shown in FIGURE 3 to the second position shown in FIGURE 4. Movement of the member 440 to the second position permits the tab 410 that caused downward deformation of the member 440 to be disengaged therefrom. Due to the resiliency of the material defining member 440, it may then spring upwardly above the actuating tab 410, and allow switch 468 to assume a closed position. When switch 468 is in a closed position, it energizes solenoid 450 and the member 440 is returned to the first position shown in FIGURE 3 to be contacted by the next of the tabs 410.

The user of the apparatus then consults the tabulation in binder 106 to determine the distance and number of degrees which the tubing K must be rotated prior to formation of the next bend therein. After the tubing K has been advanced and rotated the correct amount, the user simply steps on the switch 212, and the apparatus automatically forms a bend of the correct angulation in the tubing K. This sequential bending of the tubing is carried out, with the user remaining in a substantially fixed position relative the switch 212.

To prevent the build-up of a dangerously high pressure by the pump 124 in conduit 134, a conduit 150 is connected to the conduit 136, and this conduit 150 extends to a pressure relief valve 152 that is set for any desired maximum pressure. When this pressure is exceeded, the valve 152 opens and permits fluid to discharge through a conduit 154 to the reservoir 132.

The jaws L resist pivotal movement to a desired degree as the pressure member 56 moves downwardly, due to discharge of hydraulic fluid under a selected pressure from the valve 46 through the hoses 44 to the upper portion of the pistons 36. As fluid is discharged through the conduit 76 to move the piston 60, piston rod 58, and pressure member 56 upwardly, fluid is also discharged from the conduit 76 through a conduit 50 into the back pressure valve 46, the details of which are best seen in FIGURE 10. The valve 46 has a discharge opening formed therein that is connected to the hoses 44.

In detail, the back pressure valve 46 includes an inverted cup-shaped piston 156 that has a number of ports 158 formed in the upper portion thereof, and a ball 160 of lesser diameter than the interior of the piston is disposed within the confines thereof. The ball 160 is adapted to be forced into sealing contact with a seat 162 forming a part of the piston. Piston 156 is at all times urged upwardly in a cylindrical housing 164 by a helical spring 166, the lower end of which rests on a plate 168 that may be moved longitudinally relative to the housing by an adjustment handle 170. Movement of the plate 168 relative to the housing 164 varies the compression on spring 166. When fluid is discharged into the housing 164 through the conduit 50 as the piston 60 in cylinder 62 is moved upwardly, the ball 160 is moved from seat 162 and fluid can flow past the ball through the conduits 44 into the confines of the cylinders 36 to dispose the jaws L in the horizontal position shown in FIGURE 1. Movement of the jaws above the horizontal position shown in FIGURE 1 is prevented by stops (not shown).

The ball 160, which acts as a check, prevents flow of fluid from the conduit 50 into the conduit 44. However, when the piston rods 32 and pistons 34 connected thereto tend to move upwardly in the cylinders 36, due to outward pivotal movement of the jaws L as the pressure member 56 exerts a downward force on the tubing K, the flow of fluid through the conduits 44, valve 46 to the conduit 50, is resisted by the spring 166. The ball 160 is then in sealing engagement with the seat 162 and fluid can discharge from the conduit 44 to the conduit 50, for the piston 156 and the ball 160 move downwardly as an integral assembly until the upper extremity of the piston is disposed below the opening in the valve housing 164 that is in communication with the conduit 50.

This compression exerted by the spring 166 affords the desired resilient loading to restrain the pivotal movement of the jaws L during the bending operation. After a bend of the desired degree is formed in the tubing K due to downward movement of the pressure member 56, piston 60 and piston rod 58, and the pressure member 56 is moved to the upper position shown in FIGURE 1, fluid is again discharged into the cylinders 36 as previously described, with this trapped fluid then being so situated that a restraint of desired magnitude will be imparted to jaws L the next time the pressure member 56 is moved downwardly to form another bend in the tubing K.

In the forming of tubing K to transform the same into an exhaust pipe of desired configuration, it is desirable that the ends thereof be flanged or expanded. For this purpose, a V-shaped trough 172 is provided that extends longitudinally under the protractor support member G, as shown in FIGURE 1. The left-hand end of trough 172 is affixed to column A, and the right-hand portion of the trough is affixed by a bracket 174 to the upright B. Trough 172 has a stop 176 mounted on one end thereof, against which one end of the tubing K may abut. A second hydraulic cylinder 178 (FIGURE 11) is longitudinally disposed in the right-hand end portion of the trough 172 and has a piston 180 slidably mounted therein. Piston 180 is connected to a piston rod 182 that extends from the right-hand end of the cylinder 178 (FIGURE 1). A punch 184 is mounted on the end of piston rod 182, which punch when inserted in an end portion of the tubing K at the time the opposite end portion of the tubing abuts against the stop 176, can expand and flare the engaged end portion of the tubing.

When the handle 122 of the valve 120 is moved to a second position, fluid can be supplied through either conduit 186 or 188 connected to the end portions of the cylinder 178 to cause movement of the piston 180, piston rod 182 and punch 184 either to the right or left as illustrated in FIGURE 11. When the valve 120 is in the second position, the fluid that flows through the conduits 142 and 144 is diverted to the conduits 186 and 188, rather than to conduits 74 and 76 as previously described in connection with the operation of the pressure member 56.

Upon occasion it may be desired to program the apparatus for an odd numbered degree in the bending of tubing K. For that purpose, a tab 410a, as shown in FIGURE 12, is employed. The tab 410a includes a portion 472 that engages one of the slots 406, and an outwardly extending offset portion 474 that has a face 476 that is situated midway between two of the graduation lines 432.

The use and operation of the invention has been previously explained in detail, and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. In a machine for bending a length of tubing that includes a vertical column, two longitudinally aligned jaws rigidly connected to two shafts rotatably and pivotally supported by said column, means for tending to restrain downward pivotal movement of said said jaws, a downwardly curved pressure-exerting member in which at least one groove of semi circular cross section is formed in the lowermost surface thereof that is in vertical alignment with grooves of a generally semicircular cross section formed in said jaws, a hydraulic cylinder supported from the upper portion of said column, a piston slidably mounted in said cylinder, a piston rod connected to said piston and supporting said pressure-exerting member on the lower end thereof, a source of hydraulic liquid under pressure, solenoid operated valve means which when in a first position admits said fluid into the upper portion of said cylinder to move said pressure-exerting member downwardly to bend said tubing and when in a second position admits said fluid into said cylinder to raise said pressure-exerting member to a position above said tubing, the improvement for forming a sequence of longitudinally spaced bends in said tubing, comprising:

(a) an electric system connected to said solenoid operated valve means for moving the same to either said first or second position;

(b) a first normally open switch in said system which when closed results in said solenoid operated valve means moving to said first position;

(c) a second normally open switch in said system which when closed results in said solenoid operated valve means moving to said second position;

(d) first resilient movably supported means adjacent said second switch, said first means capable of occupying either a first or second position, and said first means when in said first position and deformed downwardly, closing said second switch;

(e) a disc having a plurality of circumferentially spaced, radially extending slots formed in the peripheral portion thereof;

(f) second means for so supporting said disc from one of said shafts that said disc rotates when said shaft rotates in a first direction but does not rotate when said shaft rotates in a second direction;

(g) a plurality of tabs selectively positioned in said slots and projecting rearwardly and outwardly therefrom to the extent that they sequentially contact said first means when in said first position to sequentially close said second switch to form a plurality of bends in said tubing, each of a desired angle, as said tubing is moved intermittently through said machine;

(h) third means for removably locking said tabs in said slots;

(i) fourth means for visually indicating the degrees of spacing of said tabs when disposed in said slots;

(j) fifth means that at all times tend to move said first means from said first position to a second position where said first means is disposed outwardly from said tabs;

(k) sixth electrically operated means which when energized, maintains said second means in said first position; and (l) a third normally closed electric switch connected to said system and to said sixth means, said third switch being so disposed relative said first means that it is opened when said first means closes said second switch, said third switch when in said open position allowing said fifth means to move said first means that is downwardly deformed to said second position, said first means upon reaching said second position moving upwardly due to the resiliency thereof to open said second switch and close said third switch, with said third switch upon being closed energizing said sixth means to move said first means to said first position, and said first means in returning to said first position being disposed above the one of said tabs causing the downward deformation of said first means to permit the further rotation of said disc and tabs supported thereon in the subsequent bending of said tubing.

2. A machine as defined in claim 1, wherein said first movably supported resilient means includes:

(m) a U-shaped element that is movable relative said column; and (n) a resilient L-shaped member supported from said U-shaped element, with said resilient member capable of being deformed downwardly by one of said tabs when said first means is in said first position.

3. A machine as defined in claim 1, wherein said third means includes:

(m) a rigid ring coaxially aligned relative said disc;

(n) resilient means covering the first face of said ring, which resilient means are in abutting contact with the rearwardly projecting portions of said tabs; and (o) screw means for supporting said ring from said disc, with said resilient means in pressure contact with said tabs.

4. A machine as defined in claim 3, wherein said fourth means includes:

(p) circumferentially spaced graduations formed on the exposed side of said ring.

5. A machine as defined in claim 2, wherein said fifth means is a deformed spring that has one end held at a fixed position relative said column, and a free end of said spring in engagement with said U-shaped element.

6. A machine as defined in claim 2, wherein said sixth means is a solenoid disposed at a fixed position relative said column, and said machine in addition including:

(q) an armature secured to said U-shaped element and having a portion thereof slidably disposed in said solenoid.

7. A machine as defined in claim 2, wherein said second and third switches are situated side-by-side, and said second and third switches having actuating members that concurrently open and close said switches depending upon the position of said first means.

References Cited

UNITED STATES PATENTS 2,797,724   7/1957   Walldow _____ 72—22
3,181,323   5/1965   Bos _____ 72—26

CHARLES W. LANHAM, *Primary Examiner.*

R. D. GREFE, *Assistant Examiner.*